GATED LATCH
Filed Dec. 2, 1964
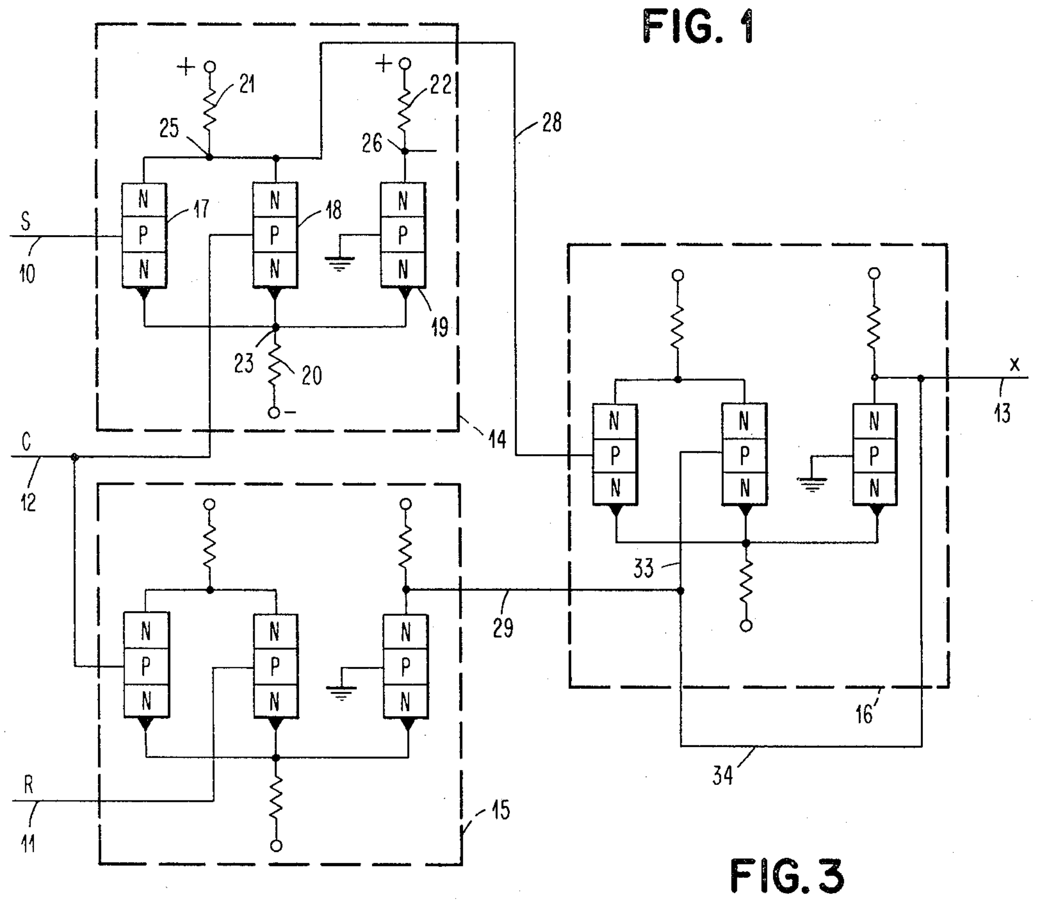
FIG. 1
FIG. 3
| x \ CSR | 000 | 001 | 011 | 010 | 110 | 111 | 101 | 100 |
|---|---|---|---|---|---|---|---|---|
| 0 | 1 | 1 | 0 | 0 | 0 | 0 | 0 | 0 |
| 1 | 1 | 1 | 1 | 0 | 1 | 1 | 1 | 1 |
X
FIG. 2
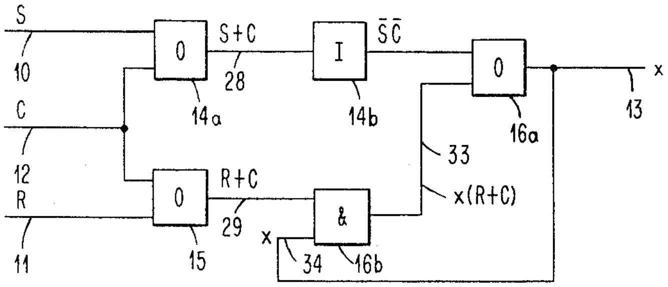
INVENTORS
GERHARD E. HOERNES
GERALD A. MALEY
BY W S Robertson
ATTORNEY

United States Patent Office 3,381,232

Patented Apr. 30, 1968

3,381,232

GATED LATCH

Gerhard E. Hoernes, Poughkeepsie, N.Y., and Gerald A. Maley, Watertown, Mass., assignors to International Business Machines Corporation, Armonk, N.Y., a corporation of New York Filed Dec. 2, 1964, Ser. No. 415,234

4 Claims. (Cl. 328—206)

This application relates generally to semiconductor circuits, more specifically to a gated latch.

A latch of the type that will be discussed is a circuit with two stable output states. Applying a momentary signal to one of the two inputs of the latch sets the latch to its corresponding output state; latching action to hold the circuit in this state after the input signal is removed is provided by a feedback connection from the output to the input. The second input of the latch controls the connection between the output and the first input; momentarily interrupting the feedback circuit resets the latch and produces an output condition to hold the latch reset after the reset signal is removed and the feedback connection is re-established. A typical latch can be described by the expression $X=s+x\bar{r}$; the term $x$ is the output value, the term X (the excitation) is the otuput state called for by the input states, including the feedback term $x$, and $s$ and $r$ represent set and reset inputs. When $X=x$ the latch has a stable state; when $X\neq x$ the latch is in a transition state that will lead to a stable state in a well designed latch. A latch having only set and reset inputs is called a set-reset latch; by providing gating circuits to control the two inputs, a set-reset latch can be made to respond to several input signals and provide a designed sequential relationship between the inputs and the output. Such a circuit is called a gated latch.

*Objects*

A general object of this invention is to provide a new and improved gated latch that receives a set input, a reset input, and a control input; the control input establishes whether the latch responds to the set or reset inputs or holds its existing state independently of these inputs. A more specific object is to provide a gated latch that uses only three logic blocks.

A logic block is a group of components performing an elemental logic function and externally wired to other logic blocks to perform more complex functions. Minimizing the number of logic blocks minimizes the number of transistors and other components required and thereby reduces the cost of the circuit. In some circuit technologies many transistors are formed on a standardized semiconductor structure, and the number of transistors in a logic block does not affect its cost; however, it is important to reduce the number of logic blocks in a circuit because the external wiring between logic blocks seriously delays propagating information through the circuit.

Set-reset latches are known that are formed in a single logic block of the type in which the output can be directly connected to one input terminal to form an appropriate logic function at that terminal with an externally applied reset signal. A more specific object of this invention is to provide a new and improved gated latch that uses a set-reset latch that is formed in a single logic block. The use of such a set-reset latch complicates the gating circuit; this problem can be understood by first considering how a simple gating circuit might operate if the latch itself did not present a problem. Suppose that the latch would hold its existing state in the absence of either a set or reset signal and that it would switch to the corresponding state when a set or reset signal was applied (such latches are well-known and are formed of two or more logic blocks). A gating circuit for such a latch could comprise simply two logic blocks, each receiving one of the two input signals and a control signal to inhibit or transmit the signals to the latch. As will be explained in the detailed description of one embodiment of the invention, set-reset latches of the type that can be formed in a single logic block cannot be held in their existing state by simply inhibiting their inputs. This difficulty occurs because the hold state of the latch corresponds to differing levels of the two input signals; simply inhibiting the signals as was considered in the hypothetical gated latch would switch the latch to a particular one of its two stable states. Thus, a specific object of the invention is to provide a gated latch having three logic blocks, one logic block of the type that forms a set-reset latch and two logic blocks that transform set and reset signals into states to hold the latch when a controlling signal is in one state and operate the latch according to set and reset signals when the controlling signal is in the other state. Another more specific object is to provide a gated latch made up of only three logic blocks in which set and reset signals are shifted in the same direction to set or reset the latch.

Another more specific object of this invention is to provide a latch in which each transition leads to a predetermined stable state; that is, a latch without a critical race. This problem and the corresponding features of the gated latch of this invention will be discussed in the description of a specific embodiment.

The drawing and the description of a specific embodiment of this latch will suggest other problems in providing a suitable gated latch and corresponding additional objects and features of this invention.

*The drawing*

FIG. 1 shows the gated latch schematically with each logic block enclosed in dashed lines to indicate the generality of the logic blocks.

FIG. 2 is a block diagram of the gated latch of FIG. 1.

FIG. 3 is a Karnaugh map that describes the operation of the circuit of FIG. 1.

*The invention; introduction*

The circuit of FIGS. 1 and 2 receives signals $s$, $r$, and $c$ at a set input 10, a reset input 11 and a control input 12, and it produces a signal $x$ at the latch output 13. The circuit includes three logic blocks 14, 15 and 16. The logic blocks illustrated in the drawing each comprise three transistors 17, 18 and 19, and three resistors 20, 21 and 22 connected to form a well-known current switch. In such a current switch the emitter terminal of each transistor is connected to a common point 23 at resistor 20 so that point 23 is up when transistor 17 or 18 is on. Two of the transistors 17, 18 each have a base terminal connected to receive an input signal at terminals 10, 11, 12 (or 28, 29 described later); they have their collector terminals connected together at a terminal 25 of resistor 21 to produce the OR/Invert function at this terminal. The other transistor 19 has its emitter terminal connected to point 23 and its base connected to ground, so that it turns off when either of the other two transistors 17, 18 is on; it produces the OR function at the connection 26 of its collector resistor 22.

A line 28 connects the invert output of block 14 to one input of block 16 and a line 29 connects the true output of block 15 to the other input of block 16.

Block 16 is connected to form a latch by means of a line 33 connecting input line 29 and output line 13 to the base terminal of a transistor. Thus resistor 22 of block 15 and resistor 22 of block 16 function as a single resistor and may comprise a single resistor. In the specific circuit of the drawing the wired connection of the two lines, 13, 29 produces an AND logic function; if transistor 19 of block 15 and transistor 19 of block 16 are both off, the line is up.

FIG. 2 shows the circuit of FIG. 1 in a more generalized form with functional boxes. As FIG. 2 shows, logic block 14 performs two functions, OR and Invert, represented by two functional boxes 14*a*, 14*b*. Logic block 16 includes the OR function of functional box 16 and the wired connection of lines 29 and 34 produces the AND function of functional box 16*b*. FIG. 2 will be helpful in understanding other embodiments of the invention as will be discussed later.

*Operation*

The excitation matrix of FIG. 3 illustrates the logical expression $X=\overline{sc}+x(c+r)$ performed by the circuit of FIG. 1. In the excitation matrix the column headings represent the state of the three inputs *c*, *r* and *s* and the row headings represent the output state; the values within the matrix represent the excitation of the circuit, the output value called for by the inputs. The stable states where the output value equals the excitation are circled in the matrix; in the uncircled states the excitation and output are unequal and the circuit is in a transition that will change the internal variable *x* and carry the circuit to a different state. In the map of FIG. 3 the right-hand four columns represent the circuit state when the control input has a 1 value and the left-hand four columns describe the circuit state when the control input has a zero value. For the condition $c=0$, the inputs *s* and *r* operate the circuit sequentially through set, reset and hold states. For $c=0$ the latch has two stable states in the column $s=1$, $r=1$; that is, the latch will retain its previous state when the set and reset signals are returned to 1 value. As the matrix also shows, the latch has a set state $x=1$ for the columns $s=0$, $r=0$ and $s=0$, $r=1$ and it has a reset state $x=0$ for the column $s=1$, $r=0$.

In the right-hand four columns of the excitation matrix there are only hold states; a change in the primary variable *c* does not change the output *x* and further changes in the primary variables *r* or *s* do not change the output.

An excitation matrix can be extended to show the state of the lines interconnecting the logic blocks; as this matrix would show, the latch has no critical races.

*Other embodiments*

As the functional boxes of FIG. 2 and the dashed lines enclosing the three circuit groups of FIG. 1 indicate, the latch can be made of any suitable logic blocks performing the appropriate logic function. Many suitable logic blocks are well-known. The drawing illustrates one interrelationship of logic blocks; according to the principle of duality an equivalent circle can be generated from FIG. 1 by converting the ANDs to ORs and ORs to ANDs and by complementing the input signals; this produces a complemented output signal. This dual would be useful with logic blocks of the type producing an AND function at the output and having the output connectable to one input terminal to form an OR function with signals at that input terminal. It should also be obvious that additional inputs can be provided within the general analysis of the circuit.

From the detailed description of one embodiment of the invention and the specific suggestions for other embodiments, those skilled in the art will recognize various modifications within the spirit of the invention and the scope of the claims.

What is claimed is:

1. A gated latch comprising:

a set-reset latch of the type having first and second input terminals and operable to hold its existing output state when said first input terminal has a one value and said second input terminal has a zero value; and operable to have set and reset output states in response to other combinations of values at said terminals;

a first logic block connected to receive a set signal and a control signal and to energize one of said latch input terminals, and a second logic block connected to receive a reset signal and said control signal and to energize the other of said latch input terminals;

the logic block connected to said latch first input terminal having a logic function to produce a one value when said control signal is in a first state and to produce one and zero values according to its other input when said control signal is in its second state, the logic block connected to said latch second input terminal having a logic function to produce a zero value when said control signal is in said first state and to produce one and zero values according to its other input when said control signal is in its second state.

2. A gated latch according to claim 1 in which said set-reset latch comprises a single logic block of the type performing one logic function and permitting a direct connection from the output terminal to one input terminal to perform at said one input terminal with other inputs to said terminal a logic function that is the dual of logic function of said single logic block.

3. A latch according to claim 2 in which the logic block connected to energize said one input terminal has the same logic function as said single logic block and the other logic block has the complementary function.

4. A gated latch comprising:

a first logic block performing an OR logic function on signals at first and second input terminals, said first terminal being connected directly to the output of said first block to perform an AND logic function on signals at said first terminal, including the signal from said output;

a second logic block connected to energize said first logic block second terminal according to an OR/Invert function of a set signal and a control signal, whereby said first logic block switches to a one value in response to a zero set signal only when said control signal has a zero value; and a third logic block connected to energize said first logic block first terminal according to an OR function of a reset signal and said control signal, whereby said first logic block switches to a zero value in response to a zero value of said reset signal and a one value of said set signal only when said control signal has a zero value and whereby said first logic block is held in its existing state when said control signal has a one value.

No references cited.

JOHN S. HEYMAN, *Primary Examiner.*

ARTHUR GAUSS, *Examiner.*

R. H. PLOTKIN, *Assistant Examiner.*